(12) United States Patent
Kropp et al.

(10) Patent No.: US 10,191,876 B2
(45) Date of Patent: *Jan. 29, 2019

(54) DEVICE AND METHOD FOR ADDRESSING, AND CONVERTER

(71) Applicant: SEW-EURODRIVE GMBH & CO. KG, Bruchsal (DE)

(72) Inventors: Wolfgang Kropp, Hochheim (DE); Andreas Schiff, Tettnang (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,208

(22) Filed: Nov. 13, 2017

(65) Prior Publication Data

US 2018/0165236 A1 Jun. 14, 2018

Related U.S. Application Data

(63) Continuation of application No. 14/601,955, filed on Jan. 21, 2015, now Pat. No. 9,817,781, which is a (Continued)

(30) Foreign Application Priority Data

Jun. 1, 2006 (DE) .................. 10 2006 026 972

(51) Int. Cl.
*G06F 13/38* (2006.01)
*G06F 12/00* (2006.01)
(Continued)

(52) U.S. Cl.
CPC ....... *G06F 13/385* (2013.01); *G05B 19/0423* (2013.01); *G06F 12/00* (2013.01); (Continued)

(58) Field of Classification Search
CPC .......... G06F 12/00; G06F 13/00; G06F 13/14; H03M 9/00; H04L 12/40
See application file for complete search history.

(56) References Cited

U.S. PATENT DOCUMENTS 5,951,666 A 9/1999 Ilting et al.
6,292,764 B1 9/2001 Avery et al.
(Continued)

FOREIGN PATENT DOCUMENTS

DE 196 39 212 A1 4/1998
DE 197 43 981 A1 4/1999
(Continued)

OTHER PUBLICATIONS

FBP Fieldbusplug, Addressing Device ASA21-FBP Technical Description, V6, 2003.*
(Continued)

*Primary Examiner* — Henry Tsai
*Assistant Examiner* — Christopher A Daley
(74) *Attorney, Agent, or Firm* — Hunton Andrews Kurth LLP

(57) ABSTRACT

It is provided to implement a different number of logical slaves in a field device for use in an AS interface network as a function of the assigned address, which slaves may be addressed using the assigned address in the standard or in the expanded addressing mode. Thus, in a field device, it is possible to provide slaves having different profiles, via which different data types may be exchanged. Furthermore, a method is provided, with which a field device having different slaves is able to be addressed in a simple manner while avoiding double addressing.

6 Claims, 5 Drawing Sheets

Related U.S. Application Data continuation of application No. 12/303,106, filed as application No. PCT/EP2007/004341 on May 16, 2007, now Pat. No. 8,972,641.

(51) Int. Cl.
  *G05B 19/042* (2006.01)
  *H04L 12/40* (2006.01)
  *H04L 29/12* (2006.01)
  *G06F 13/40* (2006.01)

(52) U.S. Cl.
  CPC .... *G06F 13/4068* (2013.01); *H04L 12/40006* (2013.01); *H04L 29/12254* (2013.01); *H04L 29/12849* (2013.01); *H04L 61/2038* (2013.01); *H04L 61/6027* (2013.01); *G05B 2219/21027* (2013.01); *G05B 2219/21043* (2013.01); *G05B 2219/25428* (2013.01); *G05B 2219/31121* (2013.01); *H04L 2012/40215* (2013.01); *H04L 2012/40221* (2013.01)

(56) References Cited

U.S. PATENT DOCUMENTS

| | | |
|---|---|---|
| 2001/0056516 A1 | 12/2001 | Schollenberger |
| 2003/0069993 A1 | 4/2003 | Na et al. |
| 2005/0068710 A1 | 3/2005 | Burr et al. |
| 2008/0222349 A1 | 9/2008 | Lee et al. |
| 2010/0153089 A1* | 6/2010 | Chrysanthakopoulos ............... G06F 13/105 703/24 |

FOREIGN PATENT DOCUMENTS

| | | |
|---|---|---|
| DE | 100 38 860 A1 | 2/2002 |
| DE | 102 06 657 A1 | 9/2003 |
| DE | 20 2005 010 659 U1 | 9/2005 |
| DE | 10 2004 032 839 B3 | 2/2006 |
| DE | 200 23 852 U1 | 12/2006 |
| EP | 0 385 502 A2 | 9/1990 |
| JP | H10-135982 A | 5/1998 |
| JP | 2003-134118 A | 5/2003 |

OTHER PUBLICATIONS

International Search Report, dated Aug. 7, 2007, in International Application No. PCT/EP2007/04341.

International Preliminary Report on Patentability, dated Jan. 13, 2009, in International Application No. PCT/EP2007/04341.

Kriesel et al., "ASI im Ueberblick," Aktuator Sensor Interface fuer die Automation, 1994, pp. 11 to 60.

A. Hunt and D. Thomas, "State Machines," IEEE Software, pp. 10-12, Nov./Dec. 2002.

ABB, Addressing Device ASA21-FBP, Technical Description, FieldBusPlug, Nov. 2003.

R. Becker (Ed.) publication AS Interface, the Design Approach in Automation, AS International Association, Ch. 3.2, Gelnhausen, 2002.

The presentation "AS-Interface" of the AS International Association, Jun. 2004. (http://www.emg.ing.tu-bs.de/pdf/IKF/AS-i.sub.--SS04.pdf).

The presentation "The AS-Interface Innovation Step 3.0" of the AS International Association, Jun. 2005.

The Web page: http://www.as.interface.com/whatisasi.asp (http://as-interface.net/whatisasi.asp).

* cited by examiner

DEVICE AND METHOD FOR ADDRESSING, AND CONVERTER

CROSS-REFERENCE TO RELATED APPLICATIONS

The present application is a continuation of U.S. patent application Ser. No. 14/601,955, filed on Jan. 21, 2015, which is a continuation of U.S. patent application Ser. No. 12/303,106 (now issued U.S. Pat. No. 8,972,641), filed on Dec. 1, 2008, which is a national phase of PCT International Application No. PCT/EP2007/004341, filed on May 16, 2007, which claims priority to German Patent Application No. 10 2006 026 972.1, filed on Jun. 1, 2006, each of which is expressly incorporated herein in its entirety by reference thereto.

FIELD OF THE INVENTION

The present invention relates to a device that is provided as a bus participant, that is, a field device, a method for addressing, and a converter.

BACKGROUND INFORMATION

An AS interface as a bit-oriented field bus on the lowest level of the automatization pyramid is described in:
the R. Becker (Ed.) publication AS Interface, the Design Approach in Automation, Gelnhausen (2002): ASInternational Association, in particular Chapter 3.2,
the Internet reference de.wikipedia.org,
DE 197 43 981,
the standard EN 50295,
the Web page http://www.as-interface.com/whatisasi.asp,
the presentation "The AS-Interface Innovation Step 3.0" of the AS International Association from Jun. 28, 2005 and
the presentation "AS-Interface" http://www.emg.ing.tu-bs.de/pdf/IKF/AS-i_SS04.pdf.

It is optimized for the connection of simple sensors, actuators, and field devices that exchange only a few information bits with the control. Thus, only four information bits are able to be transmitted from the master to the slave and back again in a data message from the AS interface.

However, modern field devices, as used in particular in systems having decentralized control technology, often require numerous parameters that may be variably adjusted to optimize the function of the field devices.

Moreover, modern field devices may often collect diagnosis and service information that supports a quick removal of problems in the event of a malfunction. This includes electronically transmittable data not only about the product, such as manufacturer, model designation, production date, state of firmware, but also about the operation, such as operating hours, number of start/stop procedures, overload states, etc.

Other field devices, for operating and observing, for example, have a simple display on which measurement data are output and a keyboard field via which commands may be input to the control, for example. Here too, different byte-oriented and bit-oriented functions are logically assigned to each other, the first ones being used for the display and the last ones being used for the keys.

To accommodate this condition, specification version 3.0 introduces slave profiles, which are provided with both bit-oriented and byte-oriented data exchange mechanisms, see the cited publication AS Interface, the Design Approach in Automation, for example. The profile S-7.A.5 is mentioned by way of example in this instance. In this profile, two bits are used in each instance for a serial data exchange; thus, only one or two bits remain for the quick bit-oriented data exchange. This in turn is too little for many applications—e.g., in drive engineering.

SUMMARY

Example embodiments of the present invention provide for refining the data exchange in a bus system in a manner that is simple and low in errors.

Among features of example embodiments of the present invention in the device provided as a bus participant are that it is connected by a connection to a bus, in particular to an electric cable, to a current bus, or connected via an antenna to air, a device for providing two or more bus participants being included, and a device being included for assigning to the two or more bus participants the data that is flowing in and/or is exchanged via the connection. Such devices that are provided as bus participants are also called field devices. An advantage of example embodiments of the present invention is that two or more bus participants are able to be connected to a bus via one connection, which simplifies the cabling. Also, by providing a plurality of bus participants, it is possible to exchange fast, bit-oriented data on the one hand, and slow, byte-oriented, complex data on the other hand. Thus, the data exchange between master and slave in a field bus system is refined such that it is possible to use different data exchange mechanisms as a function of requirements in a manner that is simple and low in errors. It is furthermore advantageous that a field device contains a group of slaves and thus may exchange different data types with a master via different data exchange mechanisms.

Among features of example embodiments of the present invention in the device connected to a bus are that it implements one logical slave, in particular, a bus participant, in a first mode, and at least two logical slaves, in particular, bus participants, in a second mode. Thus, it is advantageously made possible to switch between different modes, depending on requirements for data exchange, for example. In particular, an easily manipulable mode may be selected for an initialization of the device or the integration into the field bus system, for example, while a complex mode having a plurality of bus participants may be selected for a complex data exchange.

In example embodiments, exactly one logical slave, in particular a bus participant, is implemented in the first mode. In this context, it is advantageous that the initial operation, in particular, log on in the field bus system or address assignment, may be carried out simply.

In example embodiments, the bus is a field bus, in particular CAN, CAN-Open, DeviceNet, Profibus, INTER-BUS, AS interface, Ethernet, Wireless-LAN, EIB, LCN may be provided. In this context, it is advantageous that the bus participant is able to be connected to a standardized bus. Thus, the device according to example embodiments of the present invention may be used in a modular manner in conventional systems, in particular in systems having decentralized technology.

Example embodiments of the present invention may be used particularly advantageously in bus systems that include at least one master and a plurality of slaves, the master assigning addresses to the slaves.

In example embodiments, the first mode is a standard addressing mode; in example embodiments, the second mode is an expanded addressing mode. In this context, it is advantageous that, in particular in the event of a connection to an AS interface bus, in the first mode it is possible to assign an address that may be used in the second mode for a plurality of bus participants or logical slaves, since in the expanded addressing mode different slaves may be addressed using one address in the different cycles.

In example embodiments, the device includes a reversing logic that shifts the device from the first to the second mode when a standard address is switched, in particular from a delivery address or from address "0" to another address value. In this context, it is advantageous that it is possible to switch the modes through standard processes on the bus. It is thus possible to avoid enlarging the quantity of instructions and commands relayed via the bus.

In example embodiments, the device operates in the first mode when the address "0" is assigned, and in the second mode when an address other than "0" is assigned. In this context, it is advantageous that a procedure that is required anyway, to with the assignment of an address to a device that is identified by address "0" as newly connected to the bus, is able to be used for switching over to the more complex mode. Thus, in a simple method, addresses are able to be assigned by a master or with the aid of a conventional addressing device. When the address "0" is selected as a feature that distinguishes functions, it is particularly advantageous that AS interface slaves occupy this address during delivery. Thus, up to the addressing, the device according to example embodiments of the present invention presents itself as a standard slave vis-à-vis the master when integrated into an AS interface network. Thus, advantageously, for the user this is no different than addressing a normal slave, in particular possibly an AS interface slave. After addressing, the second mode, which is provided for the main operation of the field device, is immediately available. Furthermore, in the second mode, in the expanded addressing mode, the assigned address may advantageously be used, as described in DE 102 06 657, for example. Thus, only one address allocation is required for a plurality of slaves or bus participants. Thus, double addressing may advantageously be avoided.

In example embodiments, the at least two logical slaves have profiles that differ from each other. Thus, the slaves implemented may be used for different data transmission mechanisms. For example, bit-oriented functions may be transmitted to one slave and byte-oriented functions to another slave.

Important features of example embodiments of the present invention for the device for connecting to a bus are that the device includes a computer, the state machine of at least two bus participants being represented in the computer. In this context, it is advantageous that two or more bus participants and/or logical slaves may be implemented.

In example embodiments, the device includes one slave IC and the computer connected to it, in particular a microprocessor having memory, the slave IC being able to be used in the transparent mode. In this context, it is advantageous that a communication between bus and microprocessor and an implementation of a plurality of slaves is made possible in a simple and cost-effective manner.

In, the bus participant is arranged as an AS interface slave or another field bus slave. In this context, it is advantageous that standardized bus systems are able to be used, in particular when an AS interface bus is used.

Among features of example embodiments of the present invention in the method for addressing a device provided as a bus participant are that two logical slaves are included, wherein the device is provided with a standard address, in particular address "0," before the addressing and operated in a first mode, in particular standard addressing mode, another address is assigned to the device, and then the device implements at least two logical slaves after address assignment.

It is advantageous that the addressing of such a device is able to be performed with every addressing device that is already on the market. It is furthermore advantageous that the address "0" constitutes the standard address during delivery or new log on in the bus system of a bus participant, and it is standard for it to be followed by an address allocation by a master. In particular, the master or alternatively the user of such a device has to perform only one addressing procedure for the at least two logical slaves.

In example embodiments, in the expanded addressing mode, the slaves are addressed by the assigned address, in alternation, in sequential cycles, as A address or B address. In this context, it is advantageous that in the slave in the standard addressing mode the same address space is able to be occupied as is able to be occupied in the at least two logical slaves in the expanded addressing mode, for example. The addressing procedure is thus advantageously able to be performed without the risk of the double addressing.

Among features of example embodiments of the present invention for the converter are that a device for connecting to a bus is integrated. In this context, it is advantageous that in the converter, device(s) for communicating with a bus system are able to be provided. Thus, the converter is advantageously able to be used in systems using decentralized technologies.

In example embodiments, the microprocessor of the device for connecting to a bus is integrated into the control of the converter, in particular into the control of the power electronics of the converter. In this context, it is advantageous that the computing capacity that already exists in the control of the converter may be used for the implementation of the logical slave. This advantageously results in a compact arrangement having few components.

In example embodiments, connection device(s) for connecting actuators and/or sensors and/or a bus, for example, MOVILINK®, and/or switching outputs are included, it being possible for the bus to control or read these connecting device(s) and/or switching outputs. In this context, it is advantageous that the converter having the integrated device(s) may also be used as a slave to process the simplest functions and also as a node in the bus network, in addition to its eponymous function.

LIST OF REFERENCE CHARACTERS 1 field device
2 AS-i-line
3 slave
3A first slave
3B second slave
4 connection line
5 internal line
6 contact
7 internal line
8 connection
10 slave IC
11 microprocessor
12, 13, 14 internal data line
30 state in the first mode
31 RESET signal 32 standard addressing signal
33 state in the second mode
34 additional state in the second mode
35 bus command, sensor data, or actuator command
50 converter
52 motor
56 connecting point
54 field bus
55 connection line
56 control
58 slave
60 power electronics
62 actuator
64, 66 sensor
68 bus Example embodiments of the present invention are explained in greater detail below with reference to the figures.

DETAILED DESCRIPTION

Figure 1:
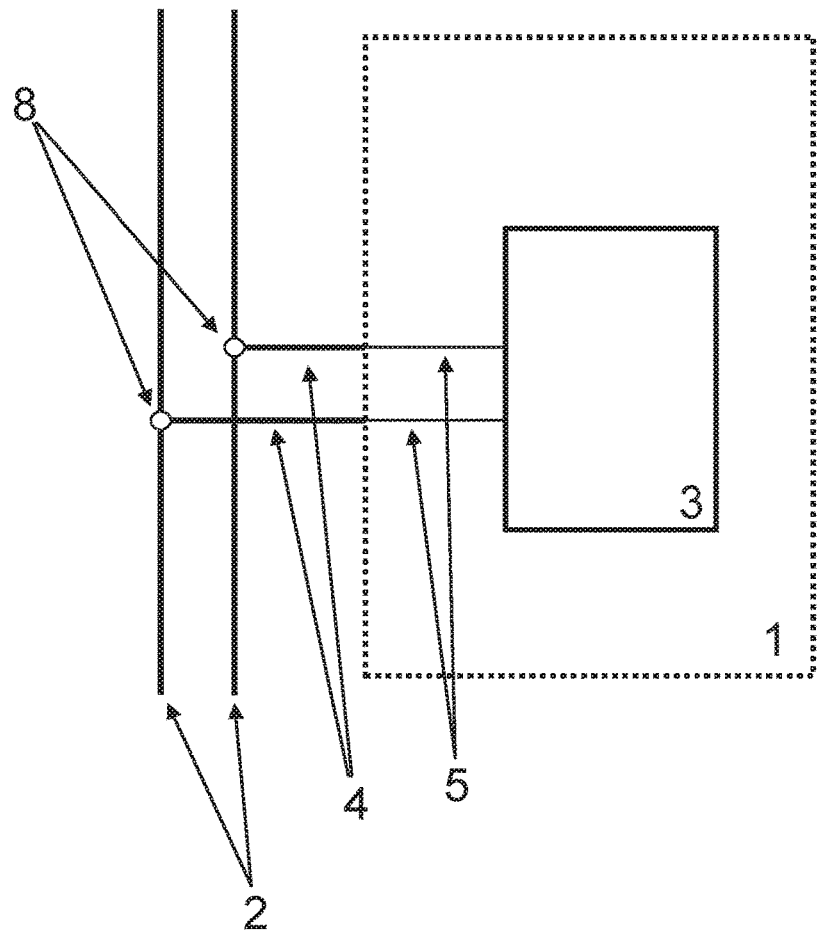
FIG. 1 is a function diagram of a field device after assignment of the address "0".

FIG. 1 shows the function diagram of a field device 1 according to an example embodiment of the present invention if it has been assigned the address "0." This is the case, for example, if field device 1 is newly installed in the delivery state or is re-installed in the AS interface network after a servicing.

Field device 1 is connected to an AS interface line 2 via a connection line 4 and a connection 8 at a connection point. It participates in the AS interface network via this connection line 4 as though connection lines 4 were connected via inner lines 5 to a slave 3 having a standard profile, for example, the profile S-7.F.F. Here, slave 3 and inner lines 5 are virtual, that is, field device 1 simulates the function illustrated.

With the aid of the address "0," a master that is also connected to the AS interface line may now detect field device 1 as a new participant and assign a free address to it, in the manner typical of AS interfaces, as is described in DE 197 43 981, for example. Alternatively, this address assignment may be carried out with a conventional addressing device.

Figure 2:
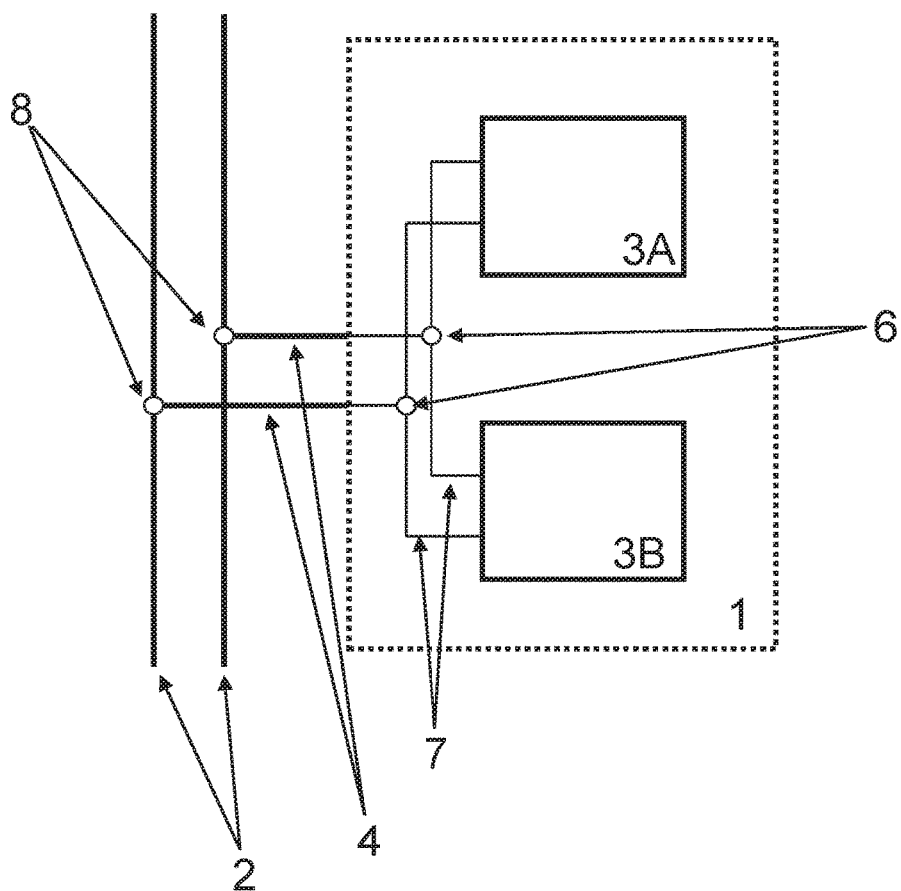
FIG. 2 is a function diagram of a field device according to an example embodiment of the present invention after assignment of an address other than "0".

FIG. 2 shows the function diagram of a field device 1 according to an example embodiment of the present invention if this has been assigned an address other than "0." This may be the case, for example, if field device 1 was detected by a master as a new participant and occupied with a free address.

Field device 1 is connected to an AS interface line 2 via a connection line 4 at a connection 8 in a connection point. In contrast to the case illustrated in FIG. 1, it participates in the AS interface network via this connection line as a bus participant of the bus system as though connection lines 4 were connected via inner lines 7 and an inner branching 6 to two slaves 3A and 3B. Advantageously, these slaves have different profiles, for example, slave 3A the profile S-7.A.7 for a quick binary and thus bit-oriented input and output, and slave 3B profile S-7.A.5 for additional digital and thus byte-oriented input and output.

The AS interface network is now operated in the expanded addressing mode, and slave 3A responds to the address of field device 1 in the A cycle, while slave 3B responds to the address of field device 1 in the B cycle.

Field device 1 thus simulates the connection of two slaves 3A and 3B to the AS interface network, slave 3A using the address of field device 1 as A address, while slave 3B uses this address as B address. Thus, a logical slave at address "0" becomes two or more logical slaves having profiles that may be predefined arbitrarily if the address is not "0."

In an exemplary embodiment according to the present invention, field device 1 simulates the connection of three, four or more slaves via connection line 4 if the address "0" was not assigned to it. For the simulation of more than two slaves, more than one address is assigned to the field device, which are able to be used in the expanded addressing method analogously to the example from FIG. 2, or an addressing mode is used, which has three, four, or more different cycles according to the type of the expanded addressing mode.

Figure 3:
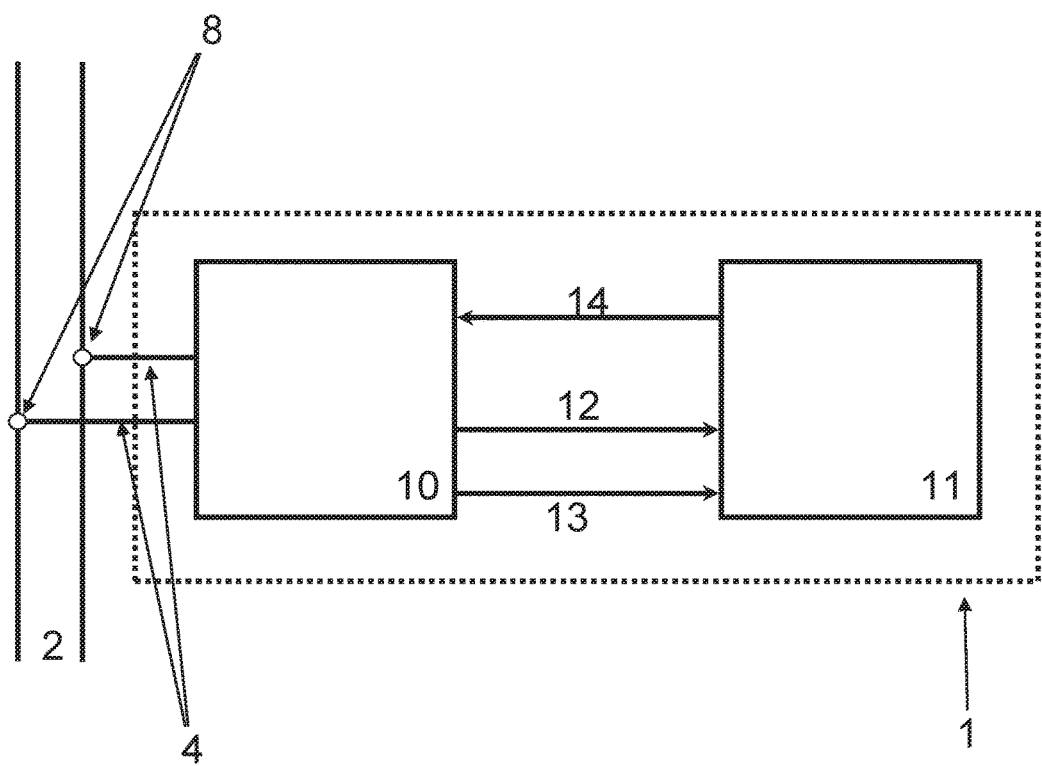
FIG. 3 is a schematic view of a field device according to an example embodiment of the present invention.

FIG. 3 shows an exemplary embodiment of a field device according to the present invention. A field device 1 is connected via connection lines 4 to an AS interface line 2 and includes a conventional slave IC 10, that is, an integrated circuit, and a microprocessor 11. Slave IC 10 is operated in the transparent mode and thus relays the data obtained from AS interface line 2 via connection lines 4 to microprocessor 11 via an internal data line 12 and relays data received from microprocessor 11 via an additional internal data line 14 to AS interface line 2. Additionally, this microprocessor 11 obtains from slave IC 10 the clock signal via an additional internal data line 13. The state machine of at least one AS interface slave is represented in the firmware of microprocessor 11, that is, the finite machine, which models all possible states of the AS interface slaves and the permitted transitions between these states. Such state machines are described in A. Hunt and D. Thomas: State Machines, IEEE Software November/December 2002, p 10-12. Thus, two or more logical slaves are able to be implemented in microprocessor 11, and microprocessor 11 may simulate a predefined number of logical slaves depending on the assigned address, which is transmitted from an addressing device or the master via slave IC 10.

Figure 4:
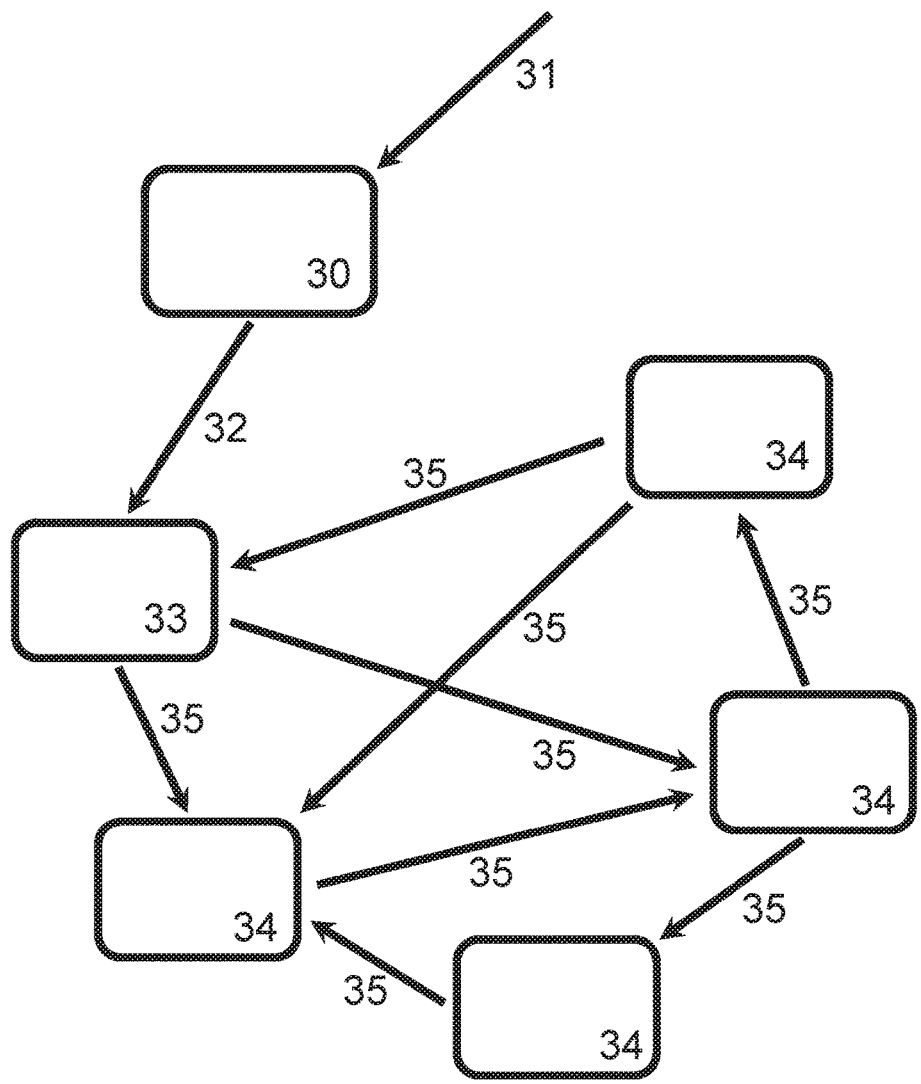
FIG. 4 illustrates the state machine of a microprocessor according to an example embodiment of the present invention.

FIG. 4 illustrates schematically the state machine of a microprocessor 11 as it may be implemented in FIG. 3. After a RESET signal 31 or in the delivery state, microprocessor 11 is in a first mode 30, in which it is assigned an address via standard addressing signals 32 from the AS interface bus and enters a state 33 of a second mode. This transition may be brought about by a reversing logic. The second mode includes this state 33 and additional states 34, which at least include the possible states of two logical slaves 3A, 3B. In particular, state 33 therefore describes two logical slaves that may be operated in the expanded addressing mode, an each one in one of the two cycles and using the address assigned by standard addressing signal 32. Between these states 33, 34 transitions 35 are brought about through bus commands, data from sensors or actuators connected to the microprocessor, or through sending commands to actuators, as necessary and typical for the implementation of the at least two logical slaves 3A, 3B.

Figure 5:
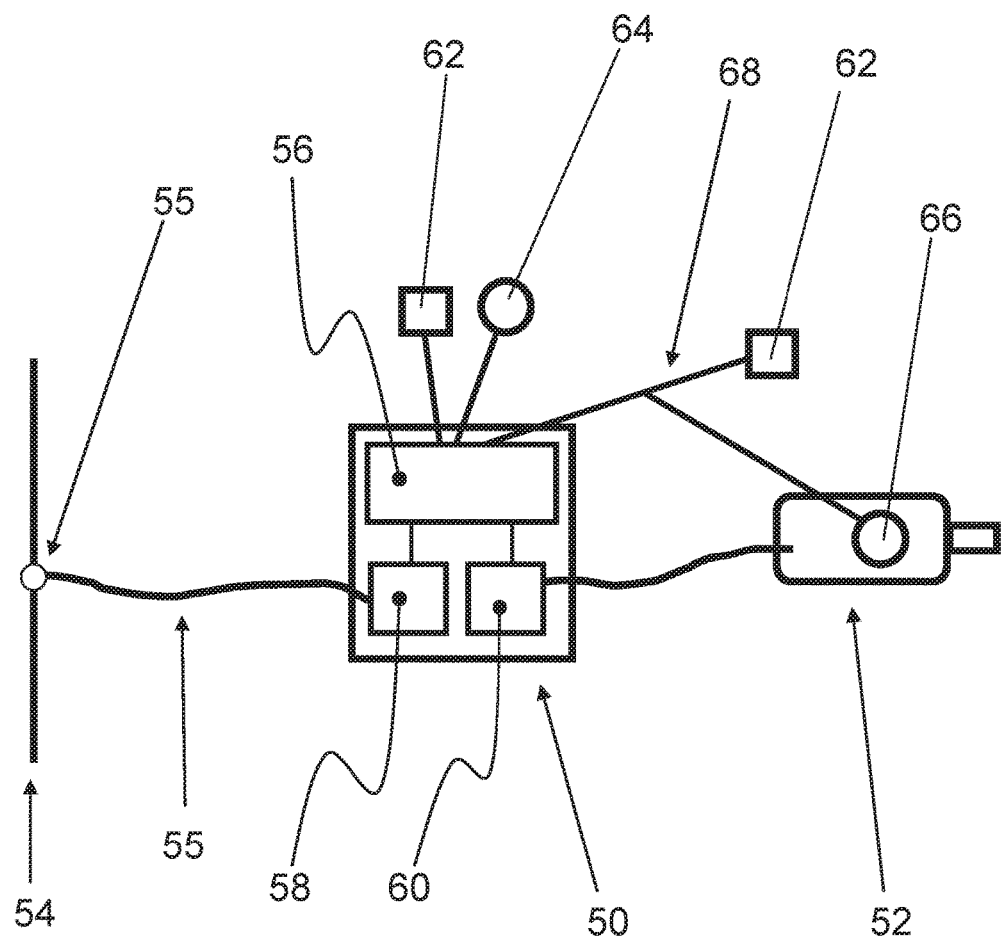
FIG. 5 illustrates a converter having a motor as a field device according to an example embodiment of the present invention.

FIG. 5 shows a use of a field device from FIG. 1 through 4. The field device is a converter 50, which is connected to an electromotor 52 and which controls or regulates it. Converter 50 is furthermore connected to a field bus 54, an AS interface bus, for example, more exactly one connection line 55 connecting a slave 58 included by converter 50 to field bus 54 via a connecting point 53. Slave 58 is thus integrated in converter 50; it is operated in the transparent mode. A microprocessor, which is designed as control 56 of converter 50, takes on the data forwarded by the slave according to the array in FIG. 3 and processes it with the aid of a state machine stored in it as shown in FIG. 4. Control 56 is simultaneously used for the control or regulation of motor 52, which is functionally typical for a converter, to wit, through the control of a power electronics 60 connected to the latter. Microprocessor 11 from FIG. 3 is thus advantageously integrated into control 56 of converter 50, which is necessary anyway and which is therefore present. Actuators 62 and sensors 64, 66 are connected to control 56 directly or via an additional bus 68 and are possibly integrated in motor 52, as shown exemplarily for sensor 66. Converter 50 is thus designed as a field device, as is advantageous for applications of the decentralized technology.

In particular, device(s) are integrated in converter 50 that allow for a use of converter 50 as a bus participant. The provision according of two logical slaves by a corresponding state machine in control 56 particularly advantageously makes it possible on the one hand for binary data for the control of actuators 62 or sensors 64, 66 to be exchanged between field bus 54 and converter 50, and on the other hand for byte-oriented data, for example, in the form of parameters for converter 50 or of commands for operating motor 52 or in the form of information about the state of converter 50 or motor 52, to be transferred.

In an exemplary embodiment according to the present invention, instead of the AS interface bus, another field bus, in particular CAN, CAN-Open, DeviceNet, Profibus, INTERBUS, Ethernet, Wireless-LAN, EIB, LCN may be provided.

What is claimed is:

1. A system, comprising:
   a device adapted to connect to a bus;
   wherein the device is adapted to implement a single logical slave as a bus participant in a first mode and at least two logical slaves as bus participants in a second mode;
   wherein the first mode is a standard addressing mode, and the second mode is an expanded address mode;
   wherein the device includes a reversing logic adapted to shift the device from the first mode to the second mode to switch the device from a standard address to an expanded address to implement the at least two logical slaves in a single addressing process, the at least two logical slaves being made available as bus participants immediately after the addressing;
   wherein the at least two logical slaves are operable in the second mode in the expanded address mode in respective cycles by an address assigned by a standard addressing signal; and
   wherein the at least two logical slaves have profiles that differ from each other.

2. The system according to claim 1, wherein the bus includes a field bus, a CAN, a CAN-Open, a DeviceNet, a Profibus, an INTERBUS, an AS interface, an Ethernet, a Wireless-LAN, an EIB, and/or an LCN.

3. The system according to claim 1, wherein the first mode is implemented when an address 0 is assigned, and the second mode is implemented when an address other than 0 is assigned.

4. A method of addressing a device connectable to a bus, the device being provided with a standard address before the addressing and operating in a first mode, comprising:
   performing a single assigning of another address to the device; and
   implementing, in the device, at least two logical slaves in a second mode in response to the single assigning of the other address, the second mode being an expanded addressing mode, the second mode being made available immediately after assigning the other address to the device, the at least two logical slaves being addressed by the assigned address in alternation in sequential cycles;
   wherein the at least two logical slaves have profiles that differ from each other.

5. The method according to claim 4, wherein the bus includes a field bus, a CAN, a CAN-Open, a DeviceNet, a Profibus, an INTERBUS, an AS interface, an Ethernet, a Wireless-LAN, an EIB, and/or an LCN.

6. The method according to claim 4, wherein the first mode is implemented when an address 0 is assigned, and the second mode is implemented when an address other than 0 is assigned.

* * * * *